United States Patent
Abraham et al.

(10) Patent No.: US 9,049,652 B2
(45) Date of Patent: Jun. 2, 2015

(54) METHOD AND SYSTEM FOR CONTROLLING ACCESS AND UTILIZATION OF FEMTOCELLS VIA A NETWORK BASED SERVICE

(75) Inventors: Charles Abraham, Los Gatos, CA (US); Xuemin Sherman Chen, Rancho Santa Fe, CA (US); Wael William Diab, San Francisco, CA (US); Vinko Erceg, Cardiff, CA (US); Victor T. Hou, La Jolla, CA (US); Jeyhan Karaoguz, Irvine, CA (US); Mark Kent, Vista, CA (US)

(73) Assignee: Broadcom Corporation, Irvine, CA (US)

( * ) Notice: Subject to any disclaimer, the term of this patent is extended or adjusted under 35 U.S.C. 154(b) by 923 days.

(21) Appl. No.: 12/395,436

(22) Filed: Feb. 27, 2009

(65) Prior Publication Data
US 2010/0222054 A1 Sep. 2, 2010

(51) Int. Cl.
*H04W 4/00* (2009.01)
*H04M 3/42* (2006.01)
*H04L 29/06* (2006.01)
*H04W 48/20* (2009.01)
*H04W 84/04* (2009.01)

(52) U.S. Cl.
CPC ............ *H04W 48/20* (2013.01); *H04W 84/045* (2013.01)

(58) Field of Classification Search
CPC .. H04W 84/045; H04W 12/06; H04W 88/085
USPC .......... 455/414.1–414.3, 432.1, 435.1, 435.2, 455/436, 437, 440, 444, 456.1–457, 422.1
See application file for complete search history.

(56) References Cited

U.S. PATENT DOCUMENTS

| 5,737,328 A | * | 4/1998 | Norman et al. | ................ 370/331 |
| 2004/0057408 A1 | * | 3/2004 | Gray | .............................. 370/338 |

(Continued)

FOREIGN PATENT DOCUMENTS

| WO | WO2005021022 | 3/2005 |
| WO | 2007/000455 | 1/2007 |

OTHER PUBLICATIONS

Unpublished U.S. Appl. No. 12/391,009, filed Feb. 23, 2009.
(Continued)

*Primary Examiner* — Dung Hong
(74) *Attorney, Agent, or Firm* — Sterne, Kessler, Goldstein & Fox P.L.L.C.

(57) ABSTRACT

Aspects of a method and system for controlling access and utilization of femtocells via a network based service are provided. In this regard, a femtocell management entity communicatively coupled to a network and operable to manage one or more femtocells may be accessed via an end-user communication device. In this manner, the femtocell(s) may be managed via the end-user device such as one of the cellular enabled communication devices. The femtocell management entity may enable establishing one or more SLAs between the femtocell(s) and the cellular enabled communication device(s). The SLA(s) may enable the cellular enabled communication device(s) to establish one or more cellular communication channels with the femtocell(s). The SLA(s) may determine when the cellular communication channels may be established. The SLA(s) may determine how a femtocell owner/operator may be compensated for providing cellular service. The femtocell(s) may be accessed utilizing Internet Protocol.

20 Claims, 7 Drawing Sheets

(56) References Cited

U.S. PATENT DOCUMENTS

| | | | |
|---|---|---|---|
| 2004/0156372 A1* | 8/2004 | Hussa | 370/401 |
| 2004/0203873 A1* | 10/2004 | H. Gray | 455/456.1 |
| 2006/0209795 A1 | 9/2006 | Chow et al. | |
| 2006/0251034 A1* | 11/2006 | Park | 370/338 |
| 2007/0121655 A1 | 5/2007 | Jin | |
| 2007/0167174 A1* | 7/2007 | Halcrow et al. | 455/456.2 |
| 2008/0216145 A1 | 9/2008 | Barton et al. | |
| 2008/0244148 A1 | 10/2008 | Nix, Jr. et al. | |
| 2009/0042536 A1* | 2/2009 | Bernard et al. | 455/406 |
| 2009/0061873 A1 | 3/2009 | Bao et al. | |
| 2009/0092081 A1* | 4/2009 | Balasubramanian et al. | 370/328 |
| 2009/0098858 A1* | 4/2009 | Gogic | 455/411 |
| 2009/0164547 A1 | 6/2009 | Ch'ng | |
| 2009/0279430 A1 | 11/2009 | Huber et al. | |
| 2009/0288144 A1 | 11/2009 | Huber et al. | |
| 2009/0288152 A1* | 11/2009 | Huber et al. | 726/6 |
| 2009/0292799 A1 | 11/2009 | Eisener et al. | |
| 2009/0316649 A1 | 12/2009 | Chen | |
| 2010/0167734 A1 | 7/2010 | Jones et al. | |
| 2010/0182991 A1 | 7/2010 | Abraham et al. | |
| 2010/0184411 A1 | 7/2010 | Chen | |
| 2010/0184414 A1 | 7/2010 | Abraham et al. | |
| 2010/0184423 A1 | 7/2010 | Kent et al. | |
| 2010/0184450 A1 | 7/2010 | Chen et al. | |
| 2010/0186027 A1 | 7/2010 | Hou et al. | |
| 2010/0210239 A1 | 8/2010 | Karaoguz et al. | |
| 2010/0220642 A1 | 9/2010 | Abraham et al. | |
| 2010/0220692 A1 | 9/2010 | Diab et al. | |
| 2010/0220731 A1 | 9/2010 | Diab et al. | |
| 2010/0222054 A1 | 9/2010 | Abraham et al. | |
| 2010/0222069 A1 | 9/2010 | Abraham et al. | |
| 2010/0238836 A1 | 9/2010 | Diab et al. | |

OTHER PUBLICATIONS

Unpublished U.S. Appl. No. 12/395,470, filed Feb. 27, 2009.
Unpublished U.S. Appl. No. 12/395,410, filed Feb. 27, 2009.
Unpublished U.S. Appl. No. 12/395,383, filed Feb. 27, 2009.
Unpublished U.S. Appl. No. 12/395,313, filed Feb. 27, 2009.
Unpublished U.S. Appl. No. 12/406,835, filed Mar. 18, 2009.
European Search Report corresponding to European Patent Application No. 10001341.6-1244, dated Jul. 5, 2010.

* cited by examiner

METHOD AND SYSTEM FOR CONTROLLING ACCESS AND UTILIZATION OF FEMTOCELLS VIA A NETWORK BASED SERVICE

CROSS-REFERENCE TO RELATED APPLICATIONS/INCORPORATION BY REFERENCE

Not applicable

FIELD OF THE INVENTION

Certain embodiments of the invention relate to communication networks. More specifically, certain embodiments of the invention relate to a method and system for controlling access and utilization of femtocells via a network based service.

BACKGROUND OF THE INVENTION

A femtocell may be placed in a customer's residence or in a small business environment, for example. Femtocells may be utilized for off-loading macro radio network facilities, improving coverage locally in a cost-effective manner, and/or implementing home-zone services to increase revenue. Femtocells, like macro base stations, may be enabled to connect "standard" phones to a cellular provider's network by a physical broadband connection which may be a digital subscriber line (DSL) connection and/or a cable connection, for example. Since the traffic between a customer's premises femtocell equipment and the operator's network may be traversing a public network, the traffic may be prone to various risks.

Communication between femtocells and one or more cellular provider's networks enables operation in private and public areas. The capacity of a femtocell may be adequate to address a typical family use model supporting two to four simultaneous voice calls and/or data, for example.

An important characteristic of femtocells is their ability to control access. In an open access scenario, any terminal and/or subscriber may be allowed to communicate with the femtocell. Accordingly, the femtocell usage may somewhat resemble that of a macrocellular system. In a closed access scenario, the femtocell may serve a limited number of terminals and/or subscribers that may be subscribed to a given cellular base station. In this regard, the cellular base station may be perceived as being deployed for private usage.

A regulatory issue with regard to femtocells is that they use licensed frequencies that radiate at a very low power in a controlled environment. It may be likely that they may not require a license from a local authority, as macrocellular base stations do. An additional regulatory issue may arise from the relationship between a femtocell operator and a broadband services operator. One possible scenario may include the broadband operator being unaware of the existence of a femtocell operator. Conversely, the broadband operator and femtocell operator may have an agreement or they may be the same operator, for example. Interference between femtocells may be an issue for femtocell deployments based on wideband technologies such as WCDMA, for example, because initial operator deployments may use the same frequency for both the femtocell and the macrocellular networks or due to the proximity of femtocell base stations in dense urban areas.

There are a plurality of design models for deployment and integration of femtocells, for example, an IP based Iu-b interface, a session initiation protocol (SIP) based approach using an Iu/A interface, use of unlicensed spectrum in a technique known as unlicensed mobile access (UMA) and/or use of IP multimedia subsystem (IMS) voice call continuity (VCC), for example.

In an Iu-b model based femtocell deployment approach, femtocells may be fully integrated into the wireless carrier's network and may be treated like any other remote node in a network. The Iu-b protocol may have a plurality of responsibilities, such as the management of common channels, common resources, and radio links along with configuration management, including cell configuration management, measurement handling and control, time division duplex (TDD) synchronization, and/or error reporting, for example. In Iu-b configurations, mobile devices may access the network and its services via the Node B link, and femtocells may be treated as traditional base stations.

In a SIP based femtocell deployment approach, a SIP client, embedded in the femtocell may be enabled to utilize SIP to communicate with the SIP-enabled mobile switching center (MSC). The MSC may perform the operational translation between the IP SIP network and the traditional mobile network, for example.

In a UMA based femtocell deployment approach, a generic access network (GAN) may offer an alternative way to access GSM and GPRS core network services over broadband. To support this approach, a UMA Network Controller (UNC) and protocols that guarantee secure transport of signaling and user traffic over IP may be utilized. The UNC may be enabled to interface into a core network via existing 3GPP interfaces, for example, to support core network integration of femtocell based services by delivering a standards based, scalable IP interface for mobile core networks.

In an IMS VCC based femtocell deployment approach, VCC may provide for a network design that may extend an IMS network to include cellular coverage and address the handoff process. The IMS VCC may be designed to provide seamless call continuity between cellular networks and any network that supports VoIP, for example. The VCC may also provide for interoperability between GSM, UMTS, and CDMA cellular networks and any IP capable wireless access network, for example. The IMS VCC may also support the use of a single phone number or SIP identity and may offer a broad collection of functional advantages, for example, support for multiple markets and market segments, provisioning of enhanced IMS multimedia services, including greater service personalization and control, seamless handoff between circuit-switched and IMS networks, and/or access to services from any IP device.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for controlling access and utilization of femtocells via a network based service, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for controlling access and utilization of femtocells via a network based service. In various embodiments of the invention, a femtocell management entity communicatively coupled to a network and operable to manage one or more femtocells may be accessed via an end-user communication device. In this manner, the femtocell(s) may be managed via the end-user device. The end-user device may be one of the cellular enabled communication devices. The femtocell management entity may enable establishing one or more service level agreements (SLAs) between the femtocell(s) and the cellular enabled communication device(s). The SLA(s) may enable the cellular enabled communication device(s) to establish one or more cellular communication channels with the femtocell(s). The SLA(s) may determine when the cellular communication channels may be established. The SLA(s) may determine how a femtocell owner/operator may be compensated for providing cellular service. The femtocell(s) may be accessed utilizing packet based protocols such as transmission control protocol/Internet Protocol (TCP/IP). The femtocell(s) may be accessed via an interface that utilizes one or more mark up languages. The femtocell management entity may be operable to determine a location of the femtocell(s). The femtocell management entity may provide usage history for the femtocell(s) and/or for the cellular enabled communication device(s). The femtocell management entity may enable storage and retrieval of information pertaining to the femtocell(s). Exemplary end-user communication devices may comprise cellular enabled communication devices, wireless communication devices, and wired communication devices.

Figure 1A:
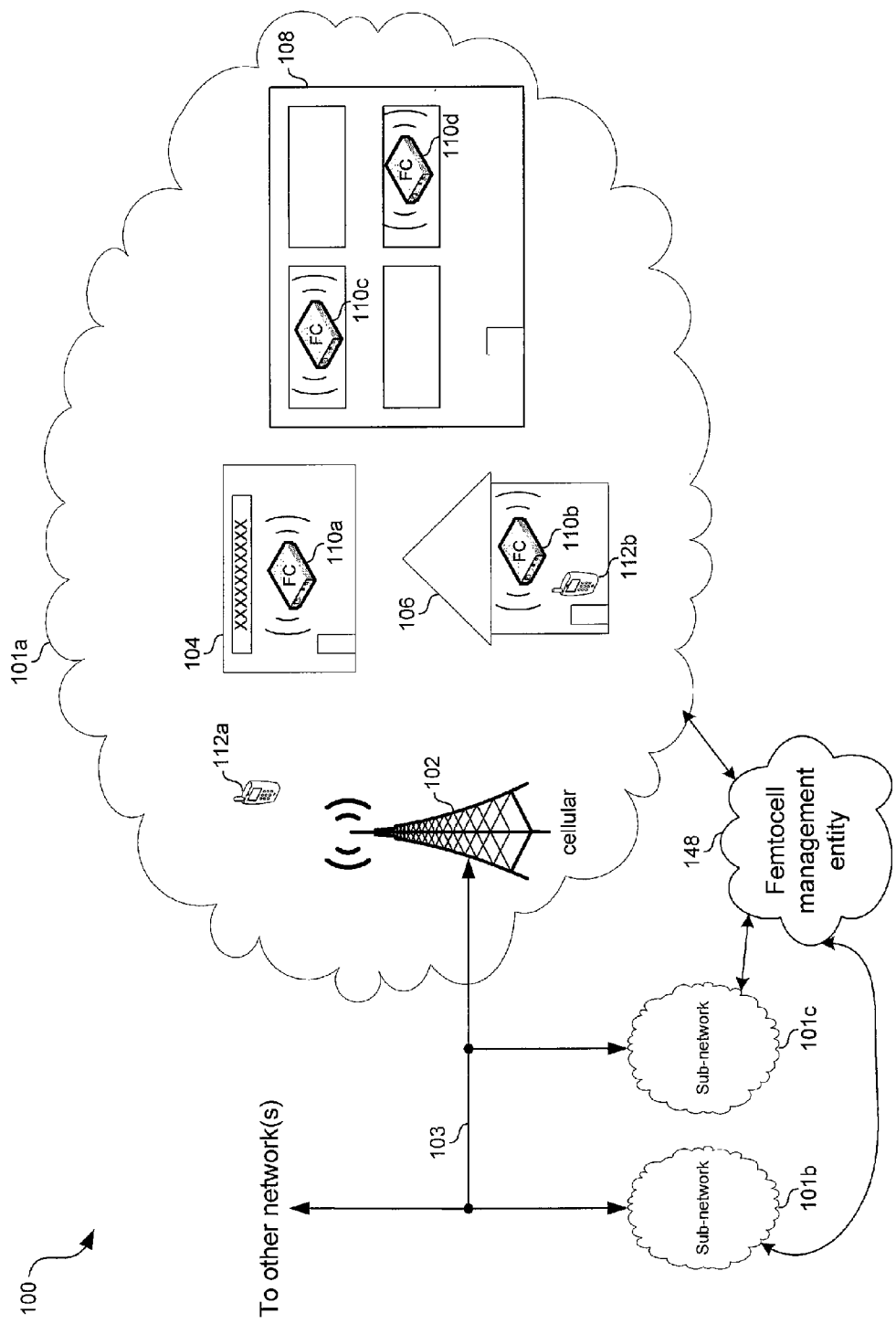
FIG. 1A is a diagram illustrating an exemplary cellular network, in accordance with an embodiment of the invention.

FIG. 1A is a diagram illustrating an exemplary cellular network, in accordance with an embodiment of the invention. Referring to FIG. 1A, there is shown a cellular network 100 comprising sub-networks 101a-101c and a femtocell management entity 148. The exemplary sub-network 101a may comprise a base station 102, femtocells 110a-110d, which are collectively referred to herein as femtocells 110, and cellular enabled communication devices 112a and 112b, which are collectively referred to herein as cellular enabled communication devices 112. The femtocells 110 may be installed in one or more commercial properties 104, one or more residential properties 106, and/or one or more multi-tenant properties 108.

The commercial properties 104 may comprise, for example, stores, restaurants, offices, and municipal buildings. The residential properties 106 may comprise, for example, single-family homes, home offices, and/or town-houses. Multi-tenant properties 108 may comprise residential and/or commercial tenants such as apartments, condos, hotels, and/or high rises.

The base station 102 may be operable to communicate data wirelessly utilizing one or more cellular standards such as IS-95, CDMA, GSM, TDMA, GPRS, EDGE, UMTS/WCDMA, TD-SCDMA, HSDPA, extensions thereto, and/or variants thereof. "Data," as utilized herein, may refer to any analog and/or digital information including but not limited to voice, Internet data, and/or multimedia content. Multimedia content may comprise audio and/or visual content comprising, video, still images, animated images, and/or textual content. The base station 102 may communicate with cellular enabled communication devices such as the cellular enabled communication devices 112. Exemplary cellular standards supported by the base station 102 may be specified in the International Mobile Telecommunications-2000 (IMT-2000) standard and/or developed by the $3^{rd}$ generation partnership project (3GPP) and/or the $3^{rd}$ generation partnership project 2 (3GPP2). The base station 102 may communicate data amongst the various components of the sub-network 101a. Additionally, data communicated to and/or from the base station 102 may be communicated to sub-network 101b, sub-network 101c, and/or to one or more other networks (not shown) via one or more backhaul links 103. In this manner, data communicated to and/or from the base station 102 may be communicated to and/or from, other portions of the network 100 and/or other networks. Exemplary networks with which data may be communicated may comprise public switched telephone networks (PSTN) and/or IP networks such as the Internet or an intranet.

The femtocell management entity 148 may comprise suitable logic, circuitry, and/or code for managing operation of one or more of the femtocells 110a-110d. The femtocell management entity 148 may comprise suitable logic, circuitry, and/or code for enabling users and femtocell owners/operators to log into the service and manage access to the femtocells 202. In various embodiments of the invention, the femtocell management entity 148 may comprise an application specific device or plurality of devices. Alternatively, the femtocell management entity 148 may reside on and/or be enabled by one or more servers 208, computing devices 212, and/or networking devices 210. For example, the femtocell management entity 148 may comprise one or more web pages, databases, and/or web based applications which may be accessed via a network. Another possibility is that one of the femtocells 110 functions as a femtocell management entity. In this regard, the femtocell may be configured by a network administrator or dynamically via logic, circuitry, and/or code. Accordingly, the femtocell management entity 148 may be local or remote to the femtocells it manages. In this regard, the femtocell may reside in one of the sub-networks 101 or may be coupled to the sub-networks 101 via the connection 103. Along the same lines, a femtocell management entity may reside on a LAN with the femtocells it manages or the femtocell management entity may reside in a service provider's network and may manage femtocells that reside in multiple LANs.

The femtocells 110 may each comprise suitable logic, circuitry, and/or code that may be operable to communicate wirelessly utilizing one or more cellular standards such as IS-95, CDMA, GSM, TDMA, GPRS, EDGE, UMTS/WCDMA, TD-SCDMA, HSDPA, extensions thereto, and/or variants thereof. In this regard, the femtocells 110 may each communicate with cellular enabled communication devices such as the cellular enabled communication devices 112. Exemplary cellular standards supported by the femtocells 110 may be specified in the International Mobile Telecommunications-2000 (IMT-2000) standard and/or developed by the $3^{rd}$ generation partnership project (3GPP) and/or the $3^{rd}$ generation partnership project 2 (3GPP2). Additionally, the femtocells 110 may each comprise suitable logic, circuitry, and/or code that may be operable to communicate over a packet based network utilizing protocols such as IP (not shown in FIG. 1A).

The cellular enabled communication devices 112 may each comprise suitable logic, circuitry, and/or code that may be operable to communicate utilizing one or more cellular standards. In this regard, the cellular enabled communication devices 112 may each be operable to transmit and/or receive data via the cellular network 100. Exemplary cellular enabled communication device may comprise laptop computers, mobile phones, and personal media players. The cellular enabled communication devices 112 may be enabled to receive, process, and present multimedia content and may additionally be enabled run a network browser or other applications for providing Internet services to a user of the cellular enabled communication device 112.

In operation, the cellular enabled communication devices 112 may gain access to the cellular network 100 and/or to other communication networks via cellular communications with the base station 102 and the femtocells 110. In this regard, in instances that a reliable connection may be established between the base station 102 and a cellular enabled communication device 112, then data may be communicated between the cellular enabled communication device 112 and the base station 102. Alternatively, in instances that a reliable connection may be established between a femtocell 110 and a cellular enabled communication device 112, then data may be communicated between the cellular enabled communication device 112 and the femtocell 110. In this regard, access by a cellular enabled communication device to a femtocell may comprise an ability of the cellular enabled communication device 112 to establish one or more cellular communication channels with the femtocell. The cellular communication channels between the cellular enabled communication device 112 and the femtocell 110 may enable the cellular enabled communication device 112 to exchange data with, for example, other cellular enabled communication devices, landline telephones, and/or network nodes such as fileservers, which may be communicatively coupled to a local area network and/or the Internet. Accordingly, the femtocells 110 may extend the cellular coverage area in the sub-network 101a. In particular, the femtocells 110 may extend or improve cellular coverage indoors or locations out of range of a basestation.

Although unlimited access to every femtocell may be ideal from a cellular user's perspective, various costs may be associated with owning and/or operating a femtocell. Thus, a femtocell owner and/or operator (referred to herein as owner/operator) may want to restrict access to the femtocell in order to limit and/or offset the costs that may be associated with owning/operating the femtocell. Accordingly, aspects of the invention may enable femtocell owners/operators and cellular users to enter into one or more femtocell service level agreements (SLAs).

By entering into a femtocell user agreement, a cellular user may be enabled to utilize femtocells which the user does not personally own and/or operate and an owner/operator of the femtocell may be compensated in return. In this regard, a femtocell SLA may determine which cellular enabled communication devices may access a femtocell, when a cellular enabled communication device may access a femtocell, and/or what compensation a cellular user may provide in return for access to a femtocell. In some instances, a femtocell owner/operator may also be a wide area cellular service provider that owns/operates basestations and/or other cellular infrastructure. Accordingly, a cellular user may pay such owners/operators in much the same way they pay for their conventional cellular service. In some instances, a cellular user may also be a femtocell owner/operator. Accordingly, a first cellular user may be allowed to access a second cellular user's femtocell in exchange for the second cellular user being allowed to access the first cellular user's femtocell.

Thus, aspects of the invention may comprise a femtocell management entity, such as the femtocell management entity 148, that may enable femtocell owners/operators to manage access to their femtocell(s) by establishing and/or entering into femtocell SLAs with other femtocell owners/operators and/or cellular users. The femtocell management entity may enable location of femtocells based on various user requirements such as cellular standard, type of SLA, location, available bandwidth, and/or available access for new users. A cellular user, upon locating a femtocell that meets their needs, may agree to the SLA associated with the femtocell and, upon acceptance of the SLA, the cellular user may then be provided cellular service via the femtocell. In accepting the SLA, the user may provide identifying information that may be utilized for billing the cellular user.

In various embodiments of the invention, a femtocell may have different SLAs with different cellular enabled communication devices and/or different cellular users. In this manner, different cellular users and/or cellular enabled communication devices may be provided different access to a femtocell and a femtocell's owner/operator may be compensated in different ways for different users and/or different cellular enabled communication devices.

Figure 1B:
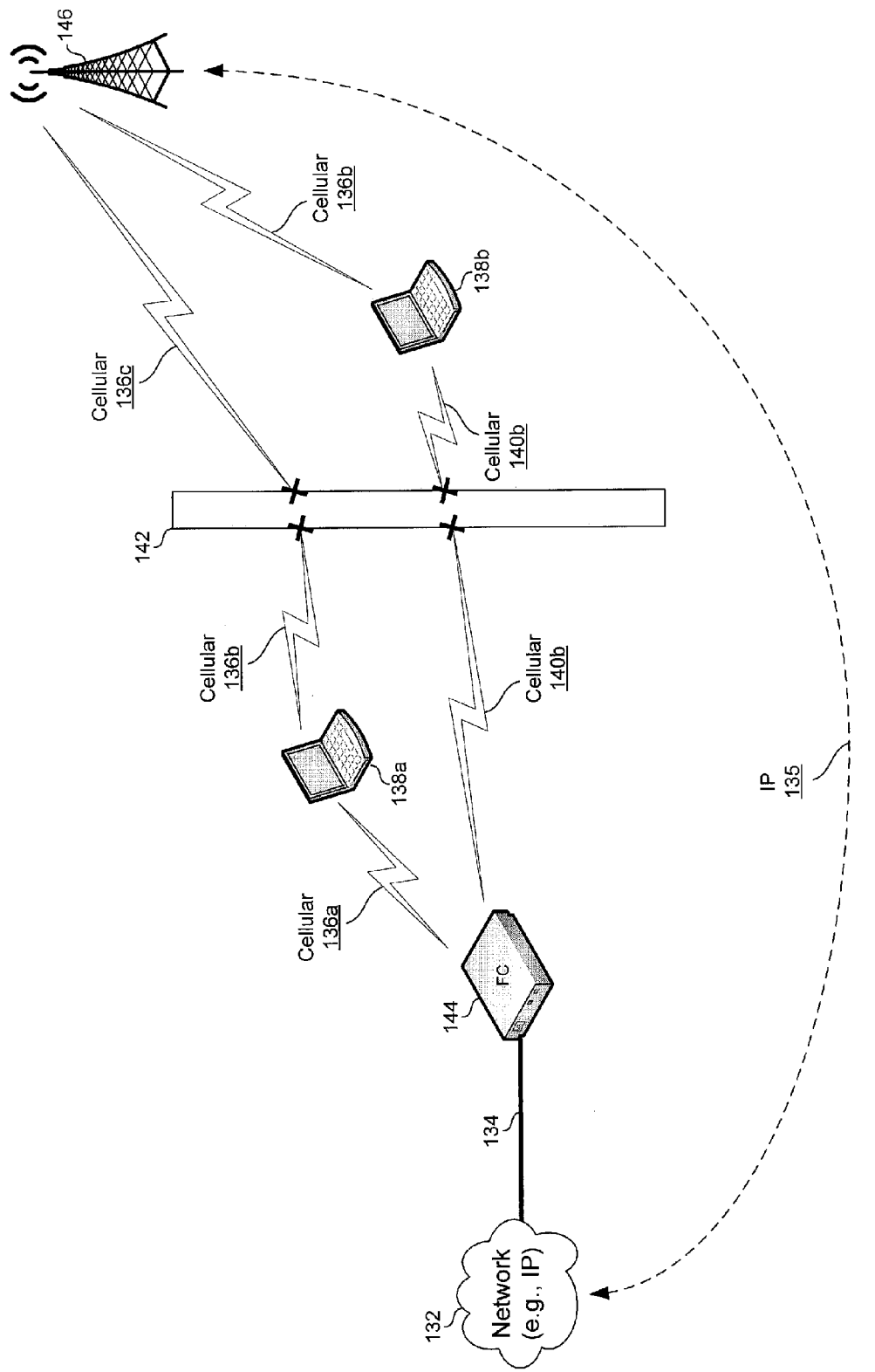
FIG. 1B is a diagram illustrating cellular communication with via a femtocell, in accordance with an embodiment of the invention.

FIG. 1B is a diagram illustrating cellular communication with via a femtocell, in accordance with an embodiment of the invention. Referring to FIG. 1B, there is shown a femtocell 144, cellular enabled communication devices 138a and 138b (collectively referred to herein as cellular enabled communication devices 138), communication barrier 142, and base station 146. The femtocell 144 may be communicatively coupled to a network 132 via a link 134.

The base station 146 may be similar to or the same as the base station 102 described with respect to FIG. 1A. The cellular enabled communication devices 138 may be similar to or the same as the cellular enabled communication devices 112 described with respect to FIG. 1A. The femtocell 144 may be similar to or the same as the femtocells 110 described with respect to FIG. 1A.

The network 132 may comprise one or more network devices and/or network links operable to transmit and/or receive information utilizing packets. The network 132 may provide access to the Internet and/or one or more private networks. The network may utilize, for example, Internet Protocol (IP).

The link 134 may comprise a broadband link such as a digital subscriber line (DSL), a passive optical network (PON) or variants thereof (e.g., EPON, GEPON, 10G-EPON, WD-PON), Ethernet, a T1/E1 line, a cable television infrastructure, a satellite television infrastructure, and/or a satellite broadband Internet link. The link 134 may comprise one or more optical, wired, and/or wireless links.

The communications barrier 142 may comprise an obstruction to cellular communications. In some instances, the barrier 142 may comprise a physical barrier such as a building or mountainous terrain. In some instances, the barrier 142 may represent a distance which may be too great for reliable cellular communications. In some instances, the barrier 142 may represent interference or a limitation of channel capacity which may prevent cellular communications. Thus, the barrier 142 may prevent, hinder, or increase the cost of cellular communications between the cellular enabled communication device 138a and the base station 146. Similarly, the barrier 142 may prevent, hinder, or increase the cost of cellular communications between the cellular enabled communication device 138b and the femtocell 144. In this regard, cost considerations, in terms money and/or power, may be factored into a decision of whether to establish cellular communications with the femtocell 144 or the base station 146. For example, the cellular enabled communication device 138b may be roaming and the user may not want to pay roaming fees to access the base-station 146.

In operation, a user of the cellular enabled communication device 138a may desire to call the cellular enabled communication device 138b but may be unable, or unwilling to pay the costs required, to communicate via the base station 146 due to the barrier 142. Accordingly, the cellular enabled communication device 138a may attempt to locate a femtocell. In this regard, the cellular enabled communication device 138a may detect the femtocell 144 by, for example, transmitting a page signal and listening for a response from any nearby femtocells, listening for a signal broadcast by any nearby femtocells, and/or by entering a current location into the network based service to retrieve a list of femtocells, their locations, and/or other information for connecting to the femtocells. In this regard, the cellular enabled communication device 138a may communicate with the network based service via, for example, a base station, a Wi-Fi hotspot or other non-cellular communication protocol, and/or via a reserved channel of the femtocell 144. A reserved channel of the femtocell 144 may provide restricted access to the femtocell 144 such that a cellular enabled communication device—even a cellular enabled communication device which does not have a SLA with the femtocell 144—may connect to the femtocell management entity.

In some instances, the cellular enabled communication device 138a may have already entered into a SLA with the femtocell 144, and thus, the cellular enabled communication device 138a may be permitted to access the femtocell 144 for placing the call to the cellular enabled communication device 138b. In other instances, the cellular enabled communication device 138a may not have a SLA with the femtocell 144, and thus the cellular enabled communication device 138a may utilize the femtocell management entity to enter into a SLA with the femtocell 144. Subsequent to establishment of a valid SLA between the femtocell 144 and the cellular enabled communication device 138a, the cellular enabled communication device 138a may be permitted to access the femtocell 144 for calling the cellular enabled communication device 138b. In this regard, the cellular enabled communication device 138a may transmit data to the femtocell 144 utilizing one or more cellular standards. The femtocell 144 may packetize the data into one or more packets and the packets may be further encapsulated, encoded, modulated, or otherwise processed. The packets may then be routed via the network 132 to the base station 146. En route to, or within, the base station 146, the data may be extracted from the packets, transcoded to a format suitable for cellular transmission. The packets may be, for example, IP packets. The base station 146 may then transmit the data to the cellular enabled communication device 138b.

Although, FIG. 1B describes communication between a pair of cellular enabled communication devices via a single femtocell and a base station, communication with other equipment via one or more femtocells and a network utilizing one or more packet based protocol such as IP may be similar to the communication described with respect to FIG. 1B. In this regard, devices which may communicate via one or more femtocells may comprise cellular enabled communication devices in other sub-networks, cellular enabled communication devices in different cellular networks, conventional "landline" phones coupled to a PSTN, IP phones, and computing devices such as PCs, fileservers, and wireless access points coupled to an IP network.

Figure 1C:
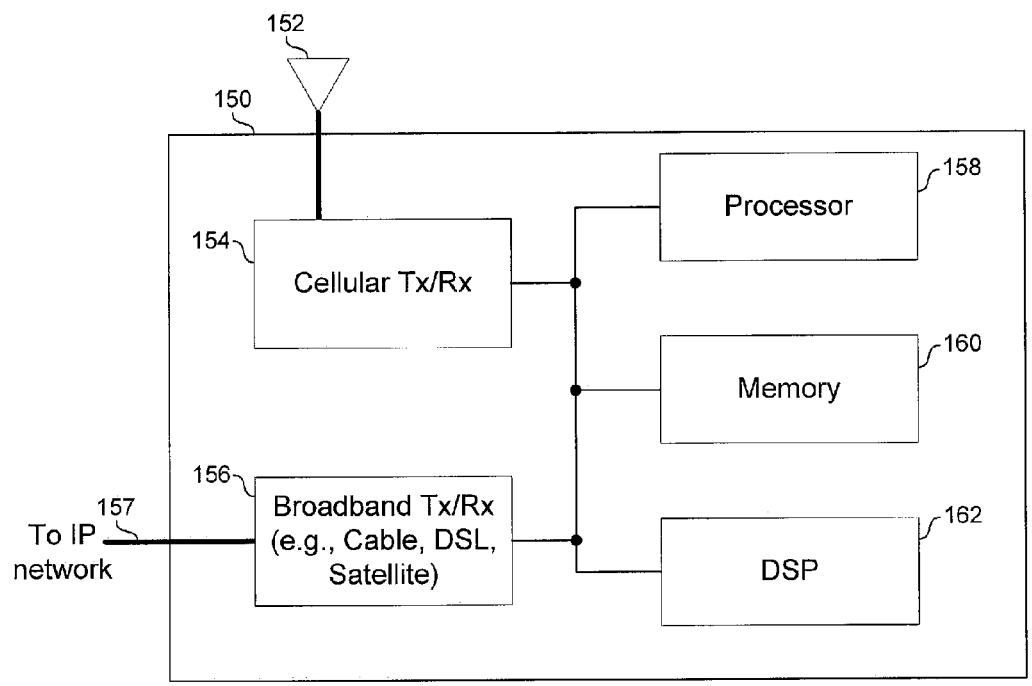
FIG. 1C is a diagram illustrating an exemplary block diagram of a femtocell, in accordance with an embodiment of the invention.

FIG. 1C is a diagram illustrating an exemplary block diagram of a femtocell, in accordance with an embodiment of the invention. Referring to FIG. 1C, there is shown a femtocell 150 comprising an antenna 152, a cellular transmitter and/or receiver (Tx/Rx) 154, a broadband transmitter and/or receiver (Tx/Rx) 156, a processor 158, a memory 160, and a digital signal processor (DSP) 162. The femtocell 150 may be similar to or the same as the femtocells 110 described with respect to FIG. 1B.

The antenna 152 may be suitable for transmitting and/or receiving cellular signals. Although a single antenna is illustrated, the invention is not so limited. In this regard, the cellular Tx/Rx 154 may utilize a common antenna for transmission and reception, may utilize different antennas for transmission and reception, and/or may utilize a plurality of antennas for transmission and/or reception.

The cellular Tx/Rx 154 may comprise suitable logic circuitry and/or code that may be operable to transmit and/or receive voice and/or data utilizing one or more cellular standards. The cellular Tx/Rx 154 may be operable to perform amplification, down-conversion, filtering, demodulation, and analog to digital conversion of received cellular signals. The cellular Tx/Rx 154 may be operable to perform amplification, up-conversion, filtering, modulation, and digital to analog conversion of transmitted cellular signals. The cellular Tx/Rx 154 may support communication over a plurality of communication channels utilizing time division multiple access (TDMA) and/or code division multiple access (CDMA). Exemplary cellular standards supported by the femtocells 110 may be specified in the International Mobile Telecommunications-2000 (IMT-2000) standard and/or developed by the $3^{rd}$ generation partnership project (3GPP) and/or the $3^{rd}$ generation partnership project 2 (3GPP2).

The broadband Tx/Rx 156 may comprise suitable logic, circuitry, and/or code that may be operable to transmit voice and/or data in adherence to one or more broadband standards. The broadband Tx/Rx 156 may be operable to perform amplification, down-conversion, filtering, demodulation, and analog to digital conversion of received signals. The broadband Tx/Rx 156 may be operable to perform amplification, up-conversion, filtering, modulation, and digital to analog conversion of transmitted signals. In various exemplary embodiments of the invention, the broadband Tx/Rx 156 may transmit and/or receive voice and/or data over the link 157 which may be a T1/E1 line, optical fiber, DSL, cable television infrastructure, satellite broadband internet connection, satellite television infrastructure, and/or Ethernet.

The processor 158 may comprise suitable logic, circuitry, and/or code that may enable processing data and/or controlling operations of the femtocell 150. In this regard, the processor 158 may be enabled to provide control signals to the various other blocks comprising the femtocell 150. The processor 158 may also control data transfers between various portions of the femtocell 150. Additionally, the processor 158 may enable execution of applications programs and/or code. In various embodiments of the invention, the applications, programs, and/or code may enable, for example, parsing, transcoding, or otherwise processing data. In various embodiments of the invention, the applications, programs, and/or code may enable, for example, configuring or controlling operation of the cellular Tx/Rx 154, the broadband Tx/Rx 156, the DSP 162, and/or the memory 160. In various embodiments of the invention, the applications, programs, and/or code may enable the femtocell 150 to be configured via a femtocell management entity. In various embodiments of the invention, the applications, programs, and/or code may enable the femtocell 150 to provide information to and/or otherwise to communicate with a femtocell management entity.

The memory 160 may comprise suitable logic, circuitry, and/or code that may enable storage or programming of information that includes parameters and/or code that may effectuate the operation of the femtocell 150. The parameters may comprise configuration data and the code may comprise operational code such as software and/or firmware, but the information need not be limited in this regard. Moreover, the parameters may include adaptive filter and/or block coefficients. Additionally, the memory 160 may buffer or otherwise store received data and/or data to be transmitted. In various embodiments of the invention, the memory 160 may comprise one or more look-up tables utilized for determining cellular enabled communication devices within a coverage area of the femtocell 150. In various embodiments of the invention, the memory 160 may comprise one or more tables or other data structures which may comprise information on cellular enabled communication devices permitted to access the femtocell 150, usage of the femtocell (e.g., month-to-date usage, past month usage, usage by cellular enabled communication device, etc.), billing methods for the cellular enabled communication devices, and/or balances due from cellular enabled communication devices.

The DSP 162 may comprise suitable logic, circuitry, and/or code operable to perform computationally intensive processing of data. In various embodiments of the invention, the DSP 162 may encode, decode, modulate, demodulate, encrypt, decrypt, scramble, descramble, and/or otherwise process data. In various embodiments of the invention, the DSP 162 may be enabled adjust a modulation scheme, error coding scheme, and/or data rates of transmitted cellular signals data.

In operation, information may be exchanged, via the broadband Tx/Rx 156, between the femtocell 150 and a femtocell management entity. The exchanged information may be communicated utilizing, for example, the Internet Protocol (IP). The exchanged information may enable managing access to the femtocell 150 by one or more cellular enabled communication devices. Information may be exchanged between the femtocell 150 and the femtocell management entity via the broadband TxRx 156. The information from the femtocell management entity may update one or more tables, lists, databases, or other data structures within the femtocell 150 that may determine permissions and/or track usage and/or billing for cellular enabled communication devices. In some embodiments of the invention, a cellular enabled communication device may connect to the femtocell management entity via a reserved channel provided by the cellular Tx/Rx 154. In this regard, data destined for the femtocell management entity from a cellular communication device may be received at the cellular Tx/Rx 154 which may down-convert, de-capsulate, and/or otherwise process the data. Additionally, the processor 158, memory 160, and/or DSP 162 may process the data prior to conveying the data to the broadband Tx/Rx 156. The broadband Tx/Rx 156 may then encapsulate, up-convert, and/or otherwise process the data and transmit the data to the femtocell management entity. Similarly, data destined for a cellular communication device from the femtocell management entity may be received at the broadband Tx/Rx 156 which may down-convert, de-capsulate, and/or otherwise process the data. Additionally, the processor 158, memory 160, and/or DSP 162 may process the data prior to conveying the data to the cellular Tx/Rx 154. The cellular Tx/Rx 154 may then encapsulate, up-convert, and/or otherwise process the data and transmit the data to the cellular enabled communication device.

Figure 2:
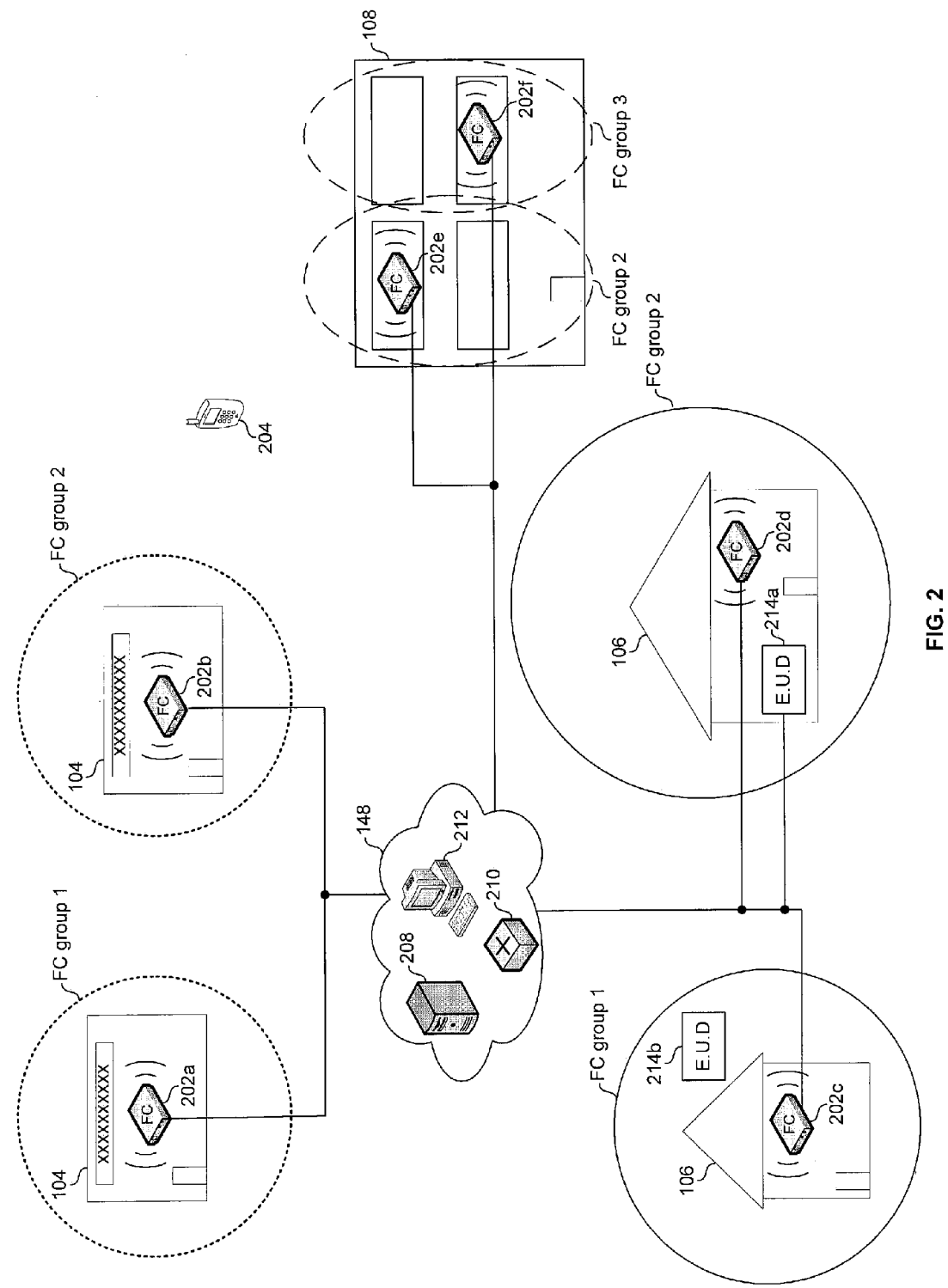
FIG. 2 is a diagram illustrating a geographic area comprising a plurality of femtocells managed via a network based service, in accordance with an embodiment of the invention.

FIG. 2 is a diagram illustrating a geographic area comprising a plurality of femtocells managed via a network based service, in accordance with an embodiment of the invention. Referring to FIG. 2, there is shown a plurality of commercial properties 104, residential properties 106, multi-tenant properties 108, femtocells 202, a cellular enabled communication device 204, end-user communication devices 214a and 214b, and a femtocell management entity 148.

The commercial properties 104, the residential properties 106, and the multi-tenant properties 108 may be as described with respect to FIG. 1A.

The cellular enabled communication device 204 may be similar to or the same as the cellular enabled communication devices 112 (FIG. 1A) and/or 138 (FIG. 1B). Exemplary cellular enabled communication devices comprise cell phones and laptop with a cellular data card. In some instances, the cellular enabled communication device 204 may be enabled to communicate with the femtocell management entity 148.

Each of the end-user communication devices 214a and 214b may comprise a cellular enabled communication device, similar to or the same as the device 204, a wireless communication device such as a Bluetooth or Wi-Fi enabled device, and/or a wired communication device such as a computer with an Ethernet port. The end-user communication device 214a and 214b may be operable to communicate with the femtocell management entity 148.

The femtocells 202a-202i, which are collectively referred to as femtocells 202, may be similar to or the same as the femtocells 110 (FIG. 1A), 144 (FIG. 1B), and/or 150 (FIG. 1C). The femtocells 202 may each be enabled to communicate with the femtocell management entity 148 via, for example, an IP connection. The femtocells 202 may each be part of a group. A group may also be referred to by other names such as a community or a network. A femtocell group may constitute a plurality of femtocells which utilize same or similar SLAs. Thus, the cellular enabled communication device 204 may join a group by committing to a SLA for the group. In this manner, joining a group may enable the cellular enabled communication device 204 to utilize the plurality of femtocells that are part of the group. For example, the cellular enabled communication device 204 may join group 2 and may then have access to femtocells 202b, 202c, 202e, and 202h. The groups of femtocells may be established via the femtocell management entity 148. However, in some embodiments of the invention, the cellular enabled communication device 204 may have different levels of access to one or more of the femtocells 202b, 202c, 202e, and 202h.

In some embodiments of the invention, femtocell groups may enable a hierarchy of permissions and/or access for various users and/or cellular enabled communication devices. For example, the owner of femtocell 202d may have a highest level of access to femtocell 202d, an owner femtocell 202a—another femtocell in group 1—may have a second highest level of access to the femtocell 202d, and users who do not own a femtocell in group 1 may have lower levels of access.

In operation, a femtocell owner may access, via an end-user communication device 214, the femtocell management entity 148 and may configure permissions for various users and/or cellular enabled communication devices based on a SLA between the femtocell owner and the various users and/or cellular enabled communication devices. Similarly, a user of the cellular enabled communication device 204 may access, via an end-user communication device 214, the femtocell management entity 148 and may configure permissions for one or more femtocells based via one or more SLAs. The permissions may control accessibility and/or service for the femtocells. In this regard, controlling accessibility and/or service may comprise the utilization of encryption and/or other techniques for secure communications. In various instances, the end-user communication device 214 may access the femtocell management entity 148 via cellular communications with a femtocell or base station, wireless communications with an access point coupled to a network, or wired communications with a network.

In various embodiments of the invention, the cellular enabled communication device 204 may select a femtocell 202 for communication based on a variety of factors. Exemplary factors may comprise existing SLAs, received signal strength from one or more femtocells 202, received signal strength from one or more base stations, distance to one or more femtocells 202, cost of service for communications via one of more femtocells 202, and cost of service for communications via a base station. For example, a cost of service may be less for femtocells than for base stations and given a choice between them a user of the cellular enabled communication device 204 may decide to communicate via a femtocell in order to save money and/or power.

In various embodiments of the invention, a femtocell may exchange information with the femtocell management entity 148 without intervention from the owners/operator, and may automatically update settings or other information stored on the femtocell and/or stored on the servers of the femtocell management entity 148.

Figure 3A:
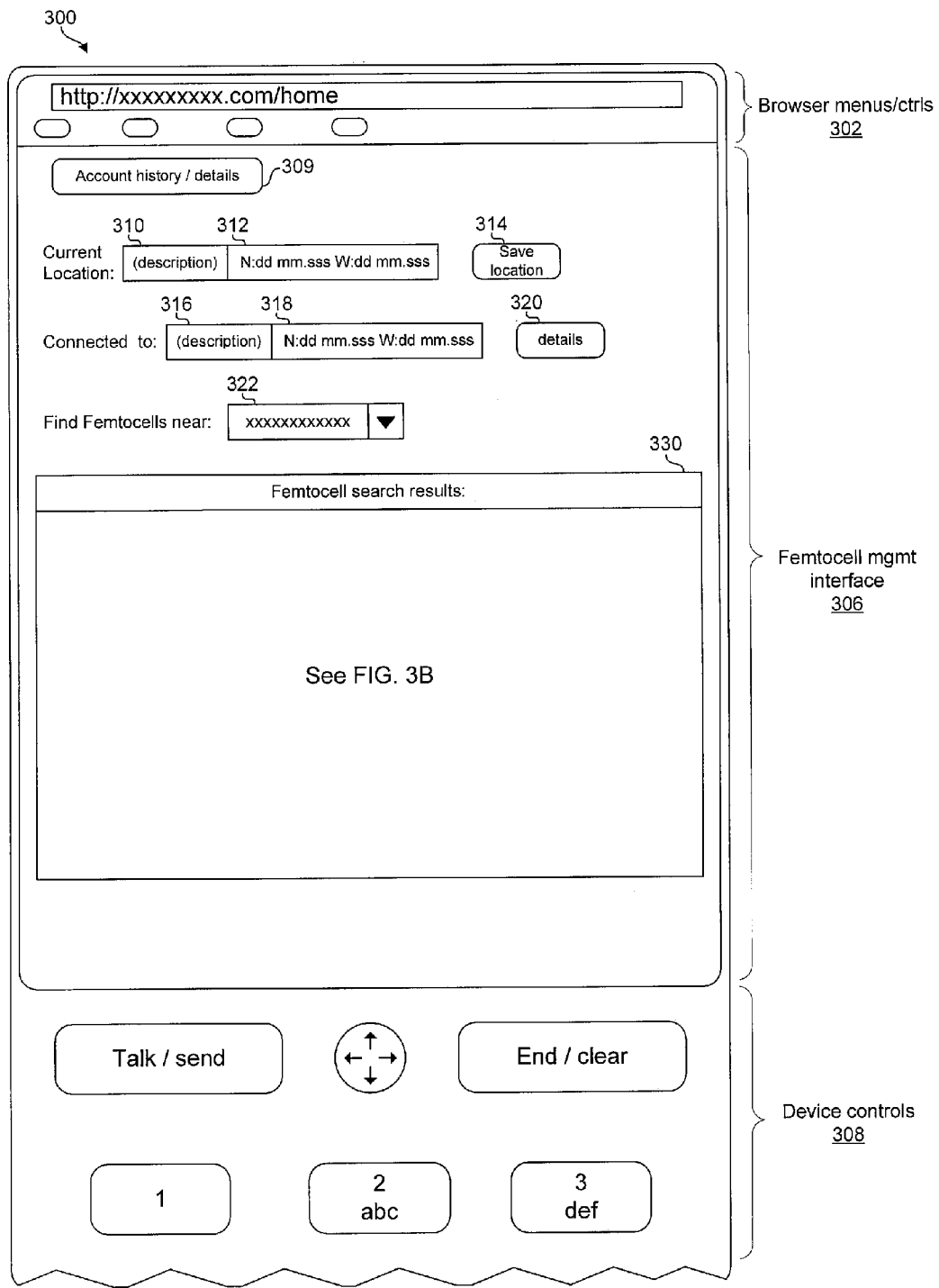
FIG. 3A is a diagram illustrating an exemplary interface for a femtocell management entity, in accordance with an embodiment of the invention.

FIG. 3A is a diagram illustrating an exemplary interface for a network based femtocell management service femtocell management entity, in accordance with an embodiment of the invention. Referring to FIG. 3A there is shown a portion of an end-user communication device 300 connected to a femtocell management entity. In the exemplary embodiment of the invention illustrated in FIG. 3A, the end-user communication device 300 may comprise a cellular enabled communication device and the femtocell management entity may be accessed via, for example, an interface utilizing one or more mark-up languages, such as web browser on the end-user communication device 300. Additionally, various aspects or portions of the interface may be implemented via code, such as an ActiveX control and/or Java Applet, running on an end-user device. However, the invention is not so limited and the femtocell management entity 148 may be accessed from an end-user communication device that is not a cellular enabled communication device. In such instances, the femtocell management entity may enable selecting from one or more cellular enabled communication devices and/or femtocells associated with a user's account or profile on the femtocell management entity. In this manner, preferences, permissions, and/or locations for a plurality of cellular enabled communication devices and/or femtocells may be managed from a single end-user communication device. Preferences and/or permissions may comprise, among other things, security settings to establish levels of security and/or techniques employed to secure data communicated to and/or from the femtocells.

Referring to FIG. 3A, below the browser menus and/or controls 302, the femtocell management entity interface 306 may comprise fields 310, 312, 316, 318 and 322; buttons 309, 314, and 320; and search results window 330. Notwithstanding, the interface illustrated in FIG. 3A is only exemplary and an actual femtocell management entity interface may comprise fewer, different, and/or additional components. n The browser menus and/or controls 302 may be conventional menus and/or controls utilized for actions such as navigating web pages, printing web pages, configuring browser options, and setting user preferences.

In various embodiments of the invention, accessing the account history and/or details button 309 may bring up a web page and/or window that displays past usage for one or more cellular enabled communication devices and/or femtocells. The devices and/or femtocells which are displayed may depend on which devices are associated with a user's account and/or profile stored on the femtocell management entity. For example, the end-user communication device 300 may be a cellular enabled communication device and the information displayed may comprise: which femtocells the end-user communication device 300 has access to based on one or more SLAs, which femtocells the end-user communication device 300 has connected to, how much data the end-user communication device 300 has exchanged with one or more femtocells, how long the end-user 300 has been connected to one or more femtocells, and a current balance of money owed by the user of the end-user communication device 300 in exchange for access to one or more femtocells. Additionally, the account history and/or details interface may enable configuring encryption and/or security settings for one or more devices associated with a user's account.

The field 310 may contain a name, if any, assigned to the current location of the end-user communication device 300. In this regard, a user of the end-user communication device 300 may, via the field 322, assign an alphanumeric name to a global navigation satellite system (GNSS) coordinates or a range of GNSS coordinates. Furthermore, the location, femtocell search results for the location, and/or preferences for the location may be saved in local memory on the end-user communication device 300. For example, "home" and "work" may be two commonly saved locations. Accordingly, a user may quickly locate femtocells near saved locations during subsequent visits to the locations, locate femtocells near saved locations when not physically at the locations, and/or find femtocells near the locations when the end-user communication device 300 is unable to access the femtocell management entity.

The field 312 may identify the GNSS coordinates of the current location of the end-user communication device 300. In various embodiments of the invention, a range of GNSS coordinates may be associated with a single location. In this regard, a radius preference may be configurable and may determine how large of an area may be considered to be a single location. The radius for each location may be determined, for example, based on the transmit strength of a femtocell.

In an exemplary embodiment of the invention, clicking the button and/or link 314 may display a web page and/or interface that may enable assigning a name to the current location. The current location may be saved to a local memory in the end-user communication device 300 and/or to a profile maintained in the femtocell management entity. Consequently, a femtocell near the current location may be quickly identified and connected to by entering and/or selecting the current location in the field 322. Additionally, saving locations may enable identifying femtocells near a location even when the user device 300 is not at that location and/or when the user device 300 cannot access the femtocell management entity. When saving a location, search results for femtocells near that location and/or user preferences of femtocells near that location may also be saved. An exemplary user preference for a location may comprise which femtocell should be connected to by default when the user device 300 is at that location.

The field 316 may identify a femtocell currently providing cellular service to the user device 300. In instances that cellular access is not available via a femtocell, the field 316 may be blank, grayed out, or locked. The field 318 may identify the location of the femtocell providing cellular services to the end-user communication device 300. In instances that cellular access is not available via a femtocell, the field 318 may be blank or grayed out. Alternatively, in instances that the end-user communication device 300 is accessing the femtocell management entity via a femtocell, the field 316 may contain a distinct alphanumeric identifier of the femtocell to which the end-user communication device 300 is connected and the field 316 may comprise the GNSS coordinates of the femtocell.

When one or more cellular communication channels have been established with a femtocell, clicking the button and/or link 320 may display a web page and/or interface that may enable viewing details of the femtocell and/or the cellular connection to the femtocell. For example, the details may provide, where applicable, how long the end-user communication device 300 has been connected, the amount of data exchanged, the network address of the femtocell, the cellular frequency and/or cellular channel on which the femtocell operates, and details of any SLA between the cellular enabled communication end-user communication device 300 and the femtocell. The femtocell search results window 330 may provide a list of nearby femtocells.

The end-user communication device 300 controls 308 may comprise hard and/or soft buttons to enable user interaction with the end-user communication device 300. Exemplary controls may comprise a touch screen, voice activation, an alphanumeric keypad, a scroll wheel, a roller ball, and/or a multi-directional button.

In operation, a user of the end-user communication device 300 may open a web browser and navigate to the femtocell management entity. In an exemplary embodiment of the invention, the user may provide a username and password to authenticate himself and/or the end-user communication device 300 to the femtocell management entity. The user may then search for femtocells near his current location or in a different location utilizing the field 322. Upon receiving a list of potential femtocells in the search results window 330, the user may sort the results to find a femtocell that best meets the user's necessary and/or desired characteristics. Upon determining a femtocell for the end-user communication device 300 to connect to, the user may obtain directions to the femtocell. The user, with the end-user communication device 300, may then move into the coverage area of the selected femtocell and cellular communications may be established between the femtocell and the end-user communication device 300.

Figure 3B:
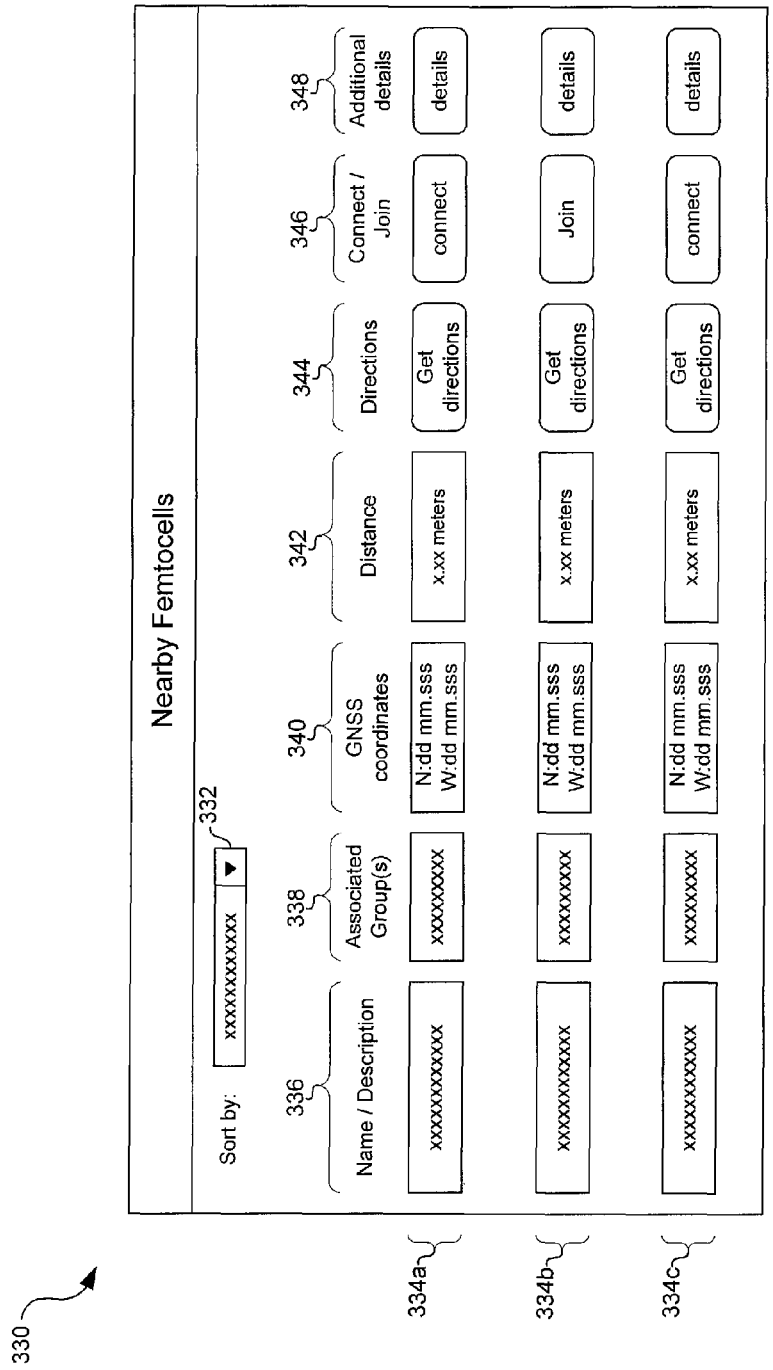
FIG. 3B is a diagram illustrating an exemplary femtocell search results window for a femtocell management entity, in accordance with an embodiment of the invention.

FIG. 3B is a diagram illustrating an exemplary femtocell search results window for a network based femtocell management service femtocell management entity, in accordance with an embodiment of the invention. Referring to FIG. 3B, the exemplary search results window comprises a drop-down list 332 and femtocell entries 334a, 334b, and 334c, collectively referred to herein as entries 334. Although only three entries 334 are depicted, the invention is not so limited and any number of entries may be displayed and/or scrollable in the window 330. Each entry 334 may comprise an identification field 336, an associated groups field 338, a GNSS coordinates field 340, a distance field 342, a directions button and/or link 344, a connect and/or join button and/or link 346, and an additional details button and/or link 348.

The identification field 336 may provide information to uniquely identify a femtocell. The identification field 336 may comprise information such as make, model, and serial number of a femtocell. Additionally or alternatively, the identification field 336 may comprise an alphanumeric identifier assigned to a femtocell by the femtocell's owner/operator. In some embodiments of the invention, the identification field 336 may comprise a unique key or number similar to or the same as an international mobile subscriber identity (ISMI) utilized by GSM and UMTS cellular networks.

The associated groups field 338 may comprise a list of groups to which a femtocell belongs. In this regard, the associated group field 338 may be utilized to determine whether the end-user communication device 300 has a SLA with a femtocell and thus whether the end-user communication device 300 may access the femtocell.

The GNSS coordinates field 340, the distance field 342, and the directions button and/or link 344 may enable a user of the end-user communication device 300 to locate and move into a coverage area of a femtocell. In this regard, the user may press the directions button and/or link 344 to bring up a web page and/or interface that may provide a map and/or directions to the femtocell.

In instances that the end-user communication device 300 has a SLA with a group to which a femtocell belongs, then the connect and/or join button and/or link 346 associated with that femtocell may enable a user of the end-user communication device 300 to connect to the femtocell. In some embodiments of the invention, after selecting the connect and/or join button and/or link 346, the user may be queried to determine whether to set the associated femtocell as the default femtocell for the selected location. In instances that the end-user communication device 300 does not have a SLA with a group to which a femtocell belongs, then the connect and/or join button and/or link 346 for the femtocell may enable a user of the end-user communication device 300 to join a group to which the femtocell belongs. In this regard, the join button and/or link 346 may bring up a SLA for the user to review and decide whether to join the group. Subsequent to entering into a SLA, the end-user communication device 300 may then be permitted to establish cellular communications with the femtocell, and/or other femtocells belonging to the group.

In an exemplary embodiment of the invention, selecting the additional details button and/or link 348 may result in the display of a web page and/or interface that may enable viewing details of the femtocell. For example, the details may provide, where applicable, a network address of the femtocell, frequencies and/or channels on which the femtocell operates, details of any SLAs which the femtocell may utilize, bandwidth and/or number of communications channels available, latency introduced by the femtocell, security settings and/or levels of the femtocell, typical data rates of communications with the femtocell, typical latencies introduced by the femtocell, and typical load (e.g., number of simultaneous connections) on the femtocell. Furthermore, the details may be broken down into by time and may enable identifying peak usage periods of the femtocell.

The drop-down list 332 may enable sorting the entries 334 by one or more of the fields 336, 338, 348, and 342. For example, a user of the end-user communication device 300 may sort the entries by associated group field 338 and then by distance field 342 to find the closest femtocell that is part of a femtocell group with which the end-user communication device 300 has a SLA. Notwithstanding, a drop-down list is just an exemplary way of sorting the entries 334 and other embodiments of the invention may sort the entries 334 by, for example, selecting, clicking on and/or activating the various entries or fields.

Figure 4:
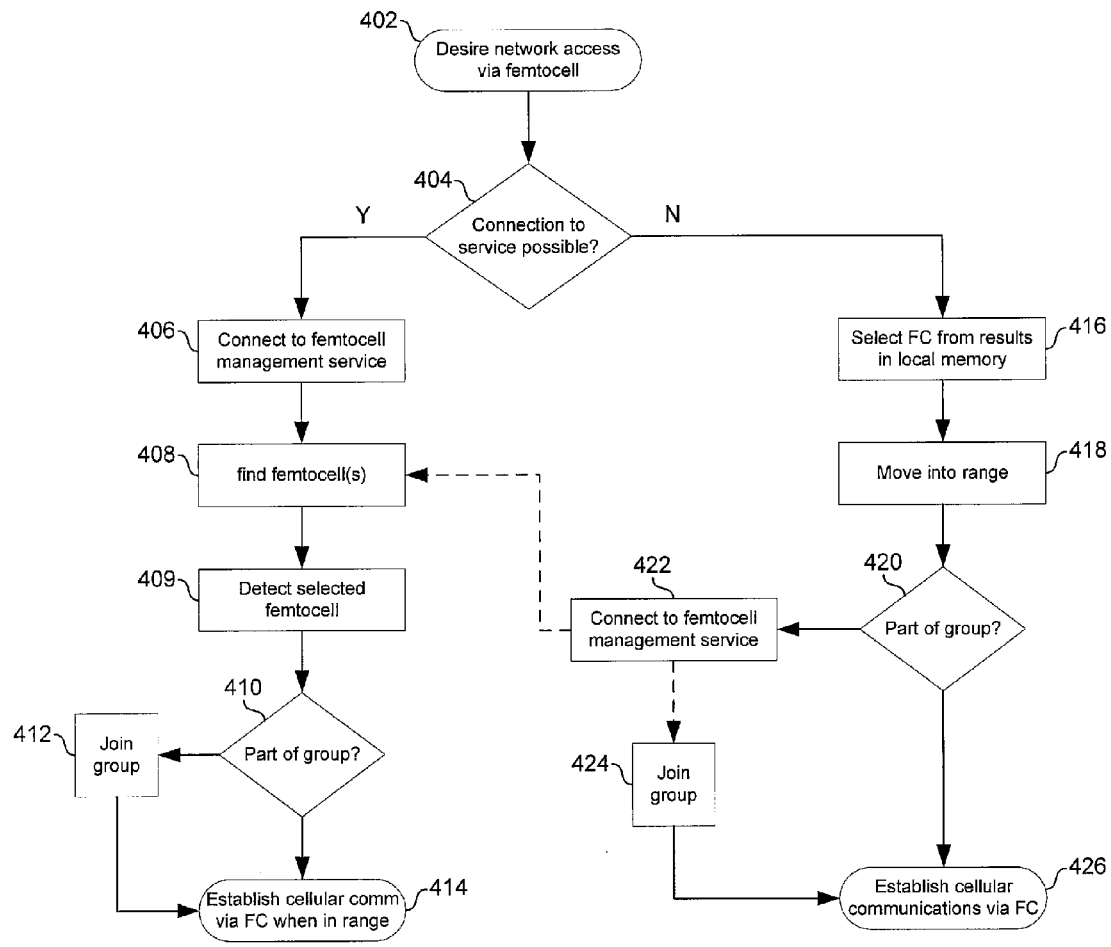
FIG. 4 is a flowchart illustrating exemplary steps for utilizing a femtocell management entity to enable cellular communications via a femtocell, in accordance with an embodiment of the invention.

FIG. 4 is a flowchart illustrating exemplary steps for utilizing a femtocell management entity to enable cellular communications via a femtocell, in accordance with an embodiment of the invention. For illustration, the steps are described with respect to the cellular enabled communication device 204 and the femtocell management entity 148 (FIGS. 1 and 2). Although FIG. 4 is described in terms of the cellular enabled communication device 204 operating as an end-user communication device enabled to access the femtocell management entity, the invention is not so limited. For example and an end-user communication device such as a laptop may access the femtocell management entity via an Ethernet connection and configure access to various femtocells for the cellular enabled communication device 204.

Referring to FIG. 4, the exemplary steps may begin with step 402 when a user of the cellular enabled communication device 204 may desire access to one or more femtocells. Subsequent to step 402, the exemplary steps may advance to step 404.

In step 404, it may be determined whether a connection may be established cellular enabled communication device 204 and the femtocell management entity 148. In various embodiments of the invention, the cellular enabled communication device 204 may attempt to access the femtocell management entity 148 via a Wi-Fi or other non-cellular communication protocol, via conventional cellular communications with a base station, and/or via a cellular connection to a femtocell. With regard to a wired connection, an end-user communication device may utilize a wired connection, such as USB, Ethernet, or IEEE 1394, to access the femtocell management entity. In this regard, the wired connection may be to, for example, a computer, a router, a femtocell, or other network device. With regard to another wireless connection, an end-user communication device may utilize a wireless connection, such as Bluetooth or Wi-Fi, to access the femtocell management entity. In this regard, the wireless connection may be to, for example, a computer, a router, a femtocell, or other network device. With regard to accessing the femtocell management entity 148 via a cellular connection to a femtocell, various embodiments of the invention a femtocell may provide a reserved and/or restricted cellular channel that may enable cellular enabled communication devices, even cellular enabled communication devices which may not have a SLA with the femtocell, to access the femtocell management entity 148. As described above with respect to, for example, FIG. 1B, a cellular enabled communication device may attempt to detect a femtocell within range by, for example, transmitting a page signal and/or listening for a broadcast signal from a femtocell. In instances that the cellular enabled communication device 204 is able to connect to the femtocell management entity 148, the exemplary steps may advance to step 406.

In step 406, the cellular enabled communication device 204 may connect to the femtocell management entity 148 in one of the ways described in step 404. In various embodiments of the invention, connecting to the femtocell management entity 148 may comprise navigating to a web site and providing information, such as a username and password, to verify the identity of the cellular enabled communication device 204 and/or its user. Subsequent to step 406, the exemplary steps may advance to step 408.

In step 408, the femtocell management entity 148 may be utilized to select, for one or more locations, one or more femtocells with which the cellular enabled communication device 204 may desire to establish cellular communications. In this regard, the femtocell management entity 148 may have an interface similar to or the same as that described with respect to FIGS. 3A and 3B and may enable selecting femtocells that have desired attributes or characteristics. In this manner one or more SLAs may be established between the cellular enabled communication device 204 and one or more femtocells. A femtocell may be selected based on one or more of: power consumption, monetary cost, bandwidth, latency, and security of the resulting cellular communications with the femtocell. Subsequent to step 408, the exemplary steps may advance to step 409.

In step 409, the cellular enabled communication device 204 may detect that it is within cellular range of one of the femtocells selected in step 408. Subsequent to step 409, the exemplary steps may advance to step 410.

In step 410, it may be determined whether the femtocell detected in step 409 is part of a group that the cellular enabled communication device 204 has a SLA with. In instances that the cellular enabled communication device 204 has a SLA with the femtocell detected in step 409, then the exemplary steps may advance to step 414.

In step 414, one or more cellular communication channels may be established between the cellular enabled communication device 204 and the femtocell detected in step 409.

Returning to step 410, in instances that the cellular enabled communication device 204 does not have a SLA with the femtocell detected in step 409, then the exemplary steps may advance to step 412.

In step 412, the femtocell management entity 148 may present the user of the cellular enabled communication device 204 with the SLA for the femtocell detected in step 409. Accordingly, the user may enter into the SLA by providing information to authenticate an identity of the user, payment information such as a credit card number, and/or the identity of the cellular enabled communication device 204. After a SLA is in place between the cellular enabled communication device 204 and the femtocell, the exemplary steps may advance to the previously described step 414.

Returning to step 404, in instances that the cellular enabled communication device 204 is unable to connect to the femtocell management entity 148, the exemplary steps may advance to step 416.

In step 416, the cellular enabled communication device 204 may attempt to select a femtocell from a list of femtocells stored in a local memory of the cellular enabled communication device 204. In this regard, search results for one or more locations may have been stored to local memory during a previous connection to the femtocell management entity 148 and/or from previous cellular communication with one or more femtocells. A femtocell may be sleeted based on one or more of: power consumption, monetary cost, bandwidth, latency, and security of the resulting cellular communications with the femtocell. Subsequent to step 416, the exemplary steps may advance to step 418.

In step 418, the user of the cellular enabled communication device 204 may move to the coverage area of the femtocell selected in step 416. Subsequent to step 418, the exemplary steps may advance to step 420.

In step 420, it may be determined whether the femtocell selected in step 416 is part of a group with which the cellular enabled communication device 204 has a SLA. In instances that the cellular enabled communication device 204 has a SLA with a femtocell selected in step 416, then the exemplary steps may advance to step 426.

In step 426, one or more cellular communication channels may be established between the cellular enabled communication device 204 and the femtocell selected in step 416.

Returning to step 420, in instances that the cellular enabled communication device 204 does not have a SLA with the femtocell selected in step 416, the exemplary steps may advance to step 422.

In step 422, the cellular communication device 204 may connect to the femtocell management entity 148. Subsequent to step 422, the exemplary steps may advance to step 424. Alternatively, once connected to the femtocell management entity 148, the exemplary steps may advance to step 408 and the cellular enabled communication device may be enabled to search for a different femtocell.

In step 424, the femtocell management entity 148 may present the user of the cellular enabled communication device 204 with the SLA for the femtocell selected in 416. Accordingly, the user may enter into the SLA by providing information to authenticate his identity and/or the identity of the cellular enabled communication device 204. After a SLA is in place between the cellular enabled communication device 204 and the femtocell selected in step 416, the exemplary steps may advance to the previously described step 426.

Exemplary aspects of a method and system for controlling access and utilization of femtocells via a network based service are provided. In an exemplary embodiment of the invention, a femtocell management entity 148 communicatively coupled to a network and operable to manage one or more femtocells 202 may be accessed via an end-user communication device 214. In this manner, the femtocell(s) 202 may be managed via the end-user device 214. The end-user device 214 may be a cellular enabled communication device such as the cellular enabled communication device 204. The femtocell management entity 148 may enable establishing one or more SLAs between the femtocell(s) 202 and the cellular enabled communication device(s) 204. The SLA(s) may enable the cellular enabled communication device(s) 204 to establish one or more cellular communication channels with the femtocell(s) 202. The SLA(s) may determine when cellular communication channels may be established. The SLA (s) may determine how an owner/operator of a femtocell 202 may be compensated for providing cellular service. The femtocell management entity 148 may be accessed utilizing Internet Protocol. The femtocell management entity 148 may be accessed via an interface that utilizes one or more mark up languages. The femtocell management entity 148 may be operable to determine locations of the femtocell(s) 202. The femtocell management entity 202 may provide usage history for the femtocell(s) 202 and/or for the cellular enabled communication device(s) 204. The femtocell management entity 148 may enable storage and retrieval of information pertaining to the femtocell(s) 202. Exemplary end-user communication devices 214 may comprise cellular enabled communication devices, wireless communication devices, and wired communication devices.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for controlling access and utilization of femtocells via a network based service.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
   accessing, by an end-user communication device, a femtocell management entity via a network, wherein the femtocell management entity is configured to manage a femtocell via the network;
   receiving, from the femtocell management entity, a list of femtocells that are within a particular distance of a current location of the end-user communication device and information pertaining to the femtocells in the list of femtocells; and
   presenting the information from the end-user communication device;
   wherein the femtocell management entity is accessed via the network by an owner/operator entity and configured by the owner/operator entity to control access to a femtocell in the list of femtocells,
   the owner/operator entity is not the end-user communication device, and
   the information comprises details of a service level agreement comprising a monetary cost for utilizing each femtocell in the list of femtocells, that is agreed upon before the end-user communication device is permitted to utilize a femtocell in the list of femtocells.

2. The method according to claim 1, wherein the information comprises distances to each femtocell in the list of femtocells from the current location of the end-user communication device.

3. The method according to claim 1, wherein the details of the service level agreement indicate when each femtocell in the list of femtocells are available for use by the end-user communication device.

4. The method according to claim 1, wherein the service level agreement enables an owner and/or operator of the femtocell in the list of femtocells to be compensated for providing cellular services to a cellular enabled communication device.

5. The method according to claim 1, wherein accessing the femtocell management entity comprises utilizing Internet Protocol.

6. The method according to claim 1, wherein accessing the femtocell management entity comprises utilizing an interface that utilizes a markup language.

7. The method according to claim 1, further comprising:
storing the list of femtocells and the information to a local memory in the end-user communication device; and
subsequent to the storing, when the femtocell management entity is not accessible by the end-user communication device, locating a femtocell from the list of femtocells utilizing the stored list of femtocells and the stored information.

8. The method according to claim 1, wherein the information comprises a usage history for each femtocell in the list of femtocells.

9. The method according to claim 1, wherein the information comprises a security setting of each femtocell in the list of femtocells.

10. The method according to claim 1, wherein the end-user communication device comprises one of: a cellular enabled communication device, a wireless communication device, and a wired communication device.

11. A system for communication, the system comprising:
a circuit for use in an end-user communication device, the circuit configured to:
communicate with a femtocell management entity via a network, wherein said the femtocell management entity is configured to manage a femtocell via the network;
receive, from the femtocell management entity, a list of femtocells that are within a particular distance of a current location of the end-user communication device and information pertaining to the femtocells in said the list; and
present the information from the end-user communication device;
wherein the femtocell management entity is accessed via the network by an owner/operator entity and configured by the owner/operator entity to control access to a femtocell in the list of femtocells,
the owner/operator entity is not the end-user communication device, and
the information comprises details of a service level agreement comprising a monetary cost for utilizing each femtocell in the list of femtocells, that is agreed upon before the end-user communication device is permitted to utilize a femtocell selected from the list of femtocells.

12. The system according to claim 11, wherein the information comprises a distance to each femtocell in the list of femtocells from the current location of the end-user communication device.

13. The system according to claim 11, wherein the details of the service level agreement indicate when the femtocell in the list of femtocells is available for use by the end-user communication device.

14. The system according to claim 11, wherein the service level agreement enables an owner and/or operator of the femtocell in the list of femtocells to be compensated for providing cellular services to the cellular enabled communication devices.

15. The system according to claim 11, wherein the circuit enables communication with the femtocell management entity utilizing Internet Protocol.

16. The system according to claim 11, wherein the circuit enables communication with the femtocell management entity via an interface that utilizes a markup language.

17. The system according to claim 11, wherein the circuit is further configured to:
store the list of femtocells and the information to a local memory in the end-user communication device; and
subsequent to the storage, when the femtocell management entity is not accessible by the end-user communication device, locate a femtocell in the list of femtocells utilizing the stored list of femtocells and the stored information.

18. The system according to claim 11, wherein the information comprises usage history for the femtocell in the list of femtocells.

19. The system according to claim 11, wherein the information comprises security settings of the femtocell in the list of femtocells.

20. The system according to claim 11, wherein the end-user communication device comprises one of: a cellular enabled communication device, a wireless communication device, and a wired communication device.

* * * * *

UNITED STATES PATENT AND TRADEMARK OFFICE
CERTIFICATE OF CORRECTION

| | |
|---|---|
| PATENT NO. | : 9,049,652 B2 |
| APPLICATION NO. | : 12/395436 |
| DATED | : June 2, 2015 |
| INVENTOR(S) | : Abraham et al. |

It is certified that error appears in the above-identified patent and that said Letters Patent is hereby corrected as shown below:

Claims

In column 19, line 44, claim 11, please replace "wherein.said the femtocell" with --wherein the femtocell--.

In column 19, line 49, claim 11, please replace "in said the list" with --in the list--.

Signed and Sealed this
Twenty-fourth Day of November, 2015

Michelle K. Lee
*Director of the United States Patent and Trademark Office*